(12) United States Patent
Ponder et al.

(10) Patent No.: US 10,104,055 B2
(45) Date of Patent: Oct. 16, 2018

(54) SYSTEM AND PROCESS OF PROTECTING CLIENT SIDE INFORMATION IN ELECTRONIC TRANSACTIONS

(71) Applicants: David Joseph Ponder, Denver, CO (US); Stephen Wang, Monroe, AL (US); Matthew Richmond, Island Park, ID (US)

(72) Inventors: David Joseph Ponder, Denver, CO (US); Stephen Wang, Monroe, AL (US); Matthew Richmond, Island Park, ID (US)

( * ) Notice: Subject to any disclaimer, the term of this patent is extended or adjusted under 35 U.S.C. 154(b) by 141 days.

(21) Appl. No.: 15/167,557

(22) Filed: May 27, 2016

(65) Prior Publication Data

US 2017/0346801 A1  Nov. 30, 2017

(51) Int. Cl.
*H04L 29/06* (2006.01)
*G06F 21/62* (2013.01)
*G06F 21/31* (2013.01)

(52) U.S. Cl.
CPC .............. *H04L 63/08* (2013.01); *G06F 21/31* (2013.01); *G06F 21/6245* (2013.01); *H04L 63/123* (2013.01)

(58) Field of Classification Search
None
See application file for complete search history.

(56) References Cited

U.S. PATENT DOCUMENTS

| 5,241,599 | A  | * | 8/1993 | Bellovin | H04L 9/0844 380/28 |
|---|---|---|---|---|---|
| 7,515,901 | B1 | * | 4/2009 | Kaundinya | G06Q 10/08 380/247 |
| 8,412,928 | B1 | * | 4/2013 | Bowness | H04L 63/0838 713/155 |
| 2002/0052921 | A1 | * | 5/2002 | Morkel | H04L 51/063 709/206 |
| 2002/0091734 | A1 | * | 7/2002 | Redlich | G06F 21/6209 715/234 |
| 2003/0084291 | A1 | * | 5/2003 | Yamamoto | H04L 63/02 713/168 |

(Continued)

FOREIGN PATENT DOCUMENTS

| EP | 2416524 | * | 2/2012 |
| WO | WO02065258 | * | 9/2002 |

OTHER PUBLICATIONS

Jesus Diaz, "Password-based authentication", found at www.certsi.es, Jan. 2015.*

(Continued)

*Primary Examiner* — Piotr Poltorak
(74) *Attorney, Agent, or Firm* — Plager Schack LLP; Mark H. Plager (57) ABSTRACT

A system, method and computer program product protects client information used for online transactions by storing transaction details on the client side of a network and avoiding storage on the host side. A hash function may be generated representing a transaction and its details on both the client and server sides. For the transaction to be processed, the hash function from the client side must match the hash function on the host side. Once authenticated, the transaction details may be read and processed while maintaining storage of the client information on the client side of the network.

6 Claims, 6 Drawing Sheets

(56) References Cited

U.S. PATENT DOCUMENTS

| | | | | |
|---|---|---|---|---|
| 2003/0093671 | A1* | 5/2003 | Owlett | H04L 9/3271 713/168 |
| 2005/0036611 | A1* | 2/2005 | Seaton, Jr. | G06F 21/31 380/44 |
| 2005/0066355 | A1* | 3/2005 | Cromer | H04N 7/162 725/31 |
| 2005/0160095 | A1* | 7/2005 | Dick | H04L 63/0428 |
| 2007/0124820 | A1* | 5/2007 | Burch | G06F 21/31 726/26 |
| 2008/0294903 | A1* | 11/2008 | Miyazaki | G06F 21/64 713/176 |
| 2009/0319776 | A1* | 12/2009 | Burch | H04L 63/08 713/155 |
| 2010/0180328 | A1* | 7/2010 | Moas | G06F 21/34 726/6 |
| 2010/0268949 | A1* | 10/2010 | Schuetze | H04L 9/002 713/168 |
| 2010/0275010 | A1* | 10/2010 | Ghirardi | G06F 21/35 713/155 |
| 2011/0302646 | A1* | 12/2011 | Ronda | H04L 9/3213 726/9 |
| 2012/0005738 | A1* | 1/2012 | Manini | H04L 63/0209 726/7 |
| 2012/0008775 | A1* | 1/2012 | Natarajan | H04L 9/3066 380/247 |
| 2012/0198531 | A1* | 8/2012 | Ort | H04W 12/06 726/7 |
| 2013/0117822 | A1* | 5/2013 | Soulez | G06Q 20/04 726/4 |
| 2013/0159195 | A1* | 6/2013 | Kirillin | G06Q 20/322 705/71 |
| 2014/0074720 | A1* | 3/2014 | Al-Herz | G06Q 20/40 705/67 |
| 2014/0074721 | A1* | 3/2014 | Al-Herz | G06Q 30/06 705/71 |
| 2015/0195280 | A1* | 7/2015 | Toyonaga | H04L 63/123 713/155 |
| 2015/0269539 | A1* | 9/2015 | MacGregor | G06Q 20/065 705/39 |
| 2015/0271183 | A1* | 9/2015 | MacGregor | H04L 63/102 726/4 |
| 2015/0334108 | A1* | 11/2015 | Khalil | G06F 21/31 726/8 |
| 2016/0203135 | A1* | 7/2016 | Bhattacharjee | G06F 17/30949 707/747 |
| 2016/0328713 | A1* | 11/2016 | Ebrahimi | H04L 9/3066 |
| 2017/0083909 | A1* | 3/2017 | Mork | G06Q 20/401 |
| 2017/0346801 | A1* | 11/2017 | Ponder | H04L 63/08 |

OTHER PUBLICATIONS

Alexandre Alapetite, "Dynamic 2D-barcodees for multi-device Web session migration including mobile phones", DOI 10.1007/s00779-009-0228-5, 2010.*

* cited by examiner

SYSTEM AND PROCESS OF PROTECTING CLIENT SIDE INFORMATION IN ELECTRONIC TRANSACTIONS

CROSS-REFERENCE TO RELATED APPLICATIONS

None.

BACKGROUND

The embodiments herein relate generally to network security and more particularly, to systems and processes for protecting client side information in electronic transactions.

With the increasing popularity of online transactions, users are increasingly placing sensitive information in the hands of third parties. For example, a routine online purchase typically involves having the user provide sensitive information including identity, residence, and financial information. At some point, conventional online transactions pull the transaction details onto the host side and store the details on the host platform's server. The host platform may conveniently access the stored transaction details for subsequent transactions. Unfortunately, this makes host servers great targets for data thieves because multiple individual's information is conveniently accessible in one location which if broken into, can become a massive data breach worth the effort.

As can be seen, there is a need for a system and method to improve protection of the client's (user's) information during online transactions.

SUMMARY

In one aspect of the subject technology, a computer program product for performing network based transactions and protecting client information, the computer program product comprising a non-transitory computer readable storage medium having computer readable program code embodied therewith, the computer readable program code being configured to: receive by a processor on a host side server of a network, a message to begin processing an online transaction; transmit by the processor on the host side of the network a message to a client side server to identify transaction information of the online transaction and generate a first client side hash function representing the identified transaction information; generate, in the host side server, a first host side hash function representing the identified transaction information; compare the generated first client side hash function to the generated first host side hash function; determine whether the generated first client side hash function matches the generated first host side hash function; in response to the generated first client side hash function matching the generated first host side hash function, store the generated first host side hash function in the host side server without storing the identified transaction information in the host side server; and process by the host side server, the online transaction.

In another aspect of the subject technology, a method of performing network based transactions and protecting client information comprises receiving by a processor on a host side server of a network, a message to begin processing an online transaction; transmitting by the processor on the host side of the network a message to a client side server to identify transaction information of the online transaction and generate a first client side hash function representing the identified transaction information; generating, in the host side server, a first host side hash function representing the identified transaction information; comparing the generated first client side hash function to the generated first host side hash function; determining whether the generated first client side hash function matches the generated first host side hash function; in response to the generated first client side hash function matching the generated first host side hash function, storing the generated first host side hash function in the host side server without storing the identified transaction information in the host side server; and processing by the host side server, the online transaction.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed invention provide a system and process that identifies electronic transactions and allows re-processing of the transactions without needing to store transaction details on the host or merchant side. In one aspect, transaction details are stored on the client side of a transaction until a hash security function is confirmed so that the details are immune from being intercepted on the host side of the transaction.

Figure 1:
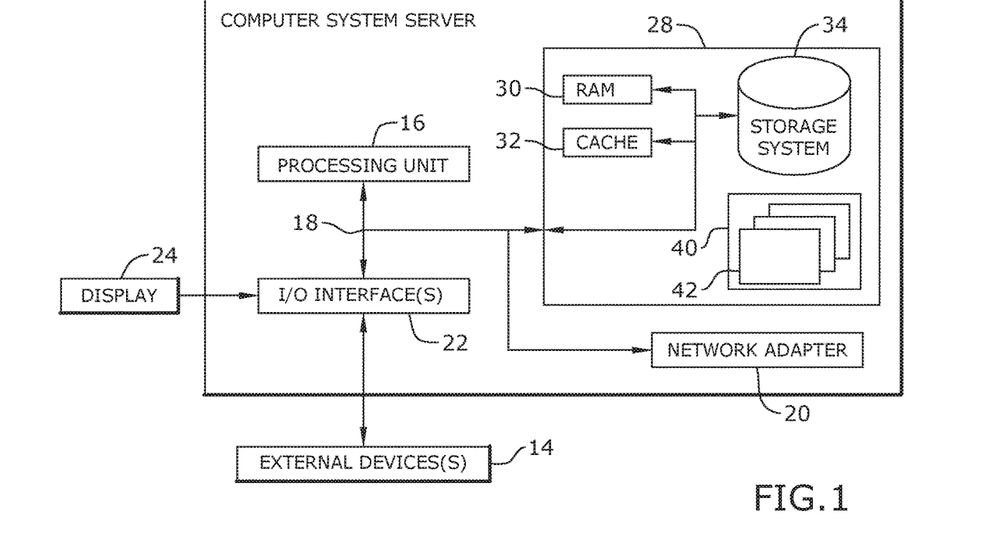
FIG. 1 is a block diagram of a computer system/server according to an embodiment of the subject technology.

Referring now to FIG. 1, a schematic of an example of a computer system/server 10 is shown. The computer system/server 10 is shown in the form of a general-purpose computing device. The components of the computer system/server 10 may include, but are not limited to, one or more processors or processing units 16, a system memory 28, and a bus 18 that couples various system components including the system memory 28 to the processor 16.

The computer system/server 10 may perform functions as different machine types depending on the role in the system the function is related to. For example, depending on the function being implemented at any given time when interfacing with the system, the computer system/server 10 may be for example, personal computer systems, server computer systems, tablet devices, mobile telephone devices, handheld or laptop devices, multiprocessor systems, microprocessor-based systems, set top boxes, programmable consumer electronics, network PCs, and distributed cloud computing environments that include any of the above systems or devices, and the like. The computer system/server 10 may be described in the general context of computer system executable instructions, such as program modules, being executed by a computer system (described for example, below). In some embodiments, the computer system/server 10 may be a cloud computing node connected to a cloud computing network (not shown). The computer system/server 10 may be practiced in distributed cloud computing environments where tasks are performed by remote processing devices that are linked through a communications network. In a distributed cloud computing environment, program modules may be located in both local and remote computer system storage media including memory storage devices.

The computer system/server 10 may typically include a variety of computer system readable media. Such media could be chosen from any available media that is accessible by the computer system/server 10, including non-transitory, volatile and non-volatile media, removable and non-removable media. The system memory 28 could include one or more computer system readable media in the form of volatile memory, such as a random access memory (RAM) 30 and/or a cache memory 32. By way of example only, a storage system 34 can be provided for reading from and writing to a non-removable, non-volatile magnetic media device typically called a "hard drive" (not shown). The system memory 28 may include at least one program product 40 having a set (e.g., at least one) of program modules 42 that are configured to carry out the functions of embodiments of the invention. For examples and as described more fully below, the program modules 42 may execute via the processor 16, actions related to generating a hash for a transaction, comparing hashes from the client side to hashes of the host side, processing transaction details, and delivering/receiving transaction processing results.

The computer system/server 10 may also communicate with one or more external devices 14 such as a keyboard, a pointing device, a display 24, etc.; and/or any devices (e.g., network card, modem, etc.) that enable the computer system/server 10 to communicate with one or more other computing devices. Such communication can occur via Input/Output (I/O) interfaces 22. Alternatively, the computer system/server 10 can communicate with one or more networks such as a local area network (LAN), a general wide area network (WAN), and/or a public network (e.g., the Internet) via a network adapter 20. As depicted, the network adapter 20 may communicate with the other components of the computer system/server 10 via the bus 18.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 34) may be utilized. In the context of this disclosure, a computer readable storage medium may be any tangible or non-transitory medium that can contain, or store a program (for example, the program product 40) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 16 of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 2:
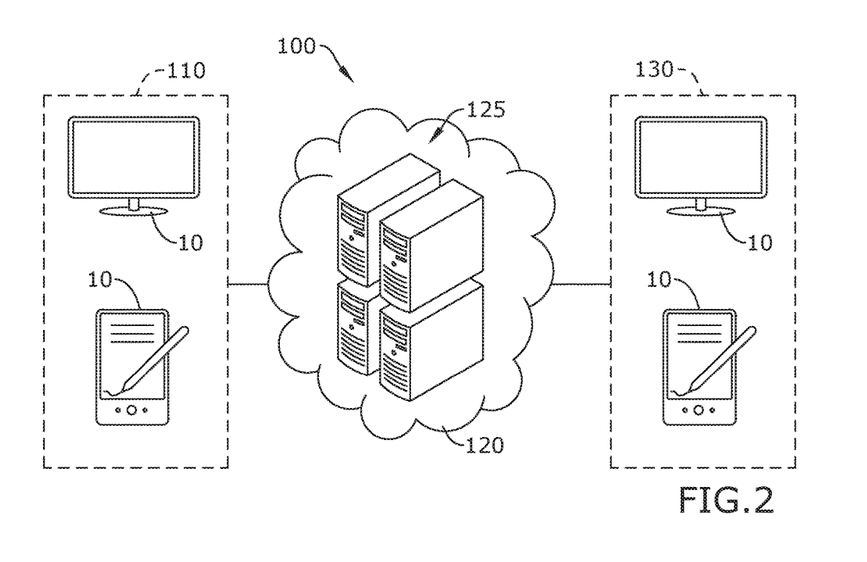
FIG. 2 is a block diagram of a network according to an embodiment of the subject technology.

Referring now to FIG. 2, a block diagram of a system 100 for performing network based transactions and protecting client information is shown. The system 100 may connect a client side 110 to a host side 130 through a network 120. The network 120 may include a server 125 which may serve as an intermediary between the client side 110 and the host side 130. The client side, the server 125, and the host side may each include a software embodiment of the invention for conducting transactions between the client side 110 and the host side 130. It will be understood that the client side 110 device(s), the host side 130 device(s), and the server 125 may function for example, under the description the computer system/server 10 of FIG. 1. As described below, methods for performing network based transactions provide security for the user by maintaining stored records of transaction details on the client side 110 while providing the transaction details to the host side 130 only for the purposes of generating hash functions and executing the transaction once hash authentication is confirmed. The end user is thus protected from for example, breaches of security on the host side 130 which expose sensitive client information to hackers and identity thieves who target databases storing multiple client users' personal information.

Figure 3:
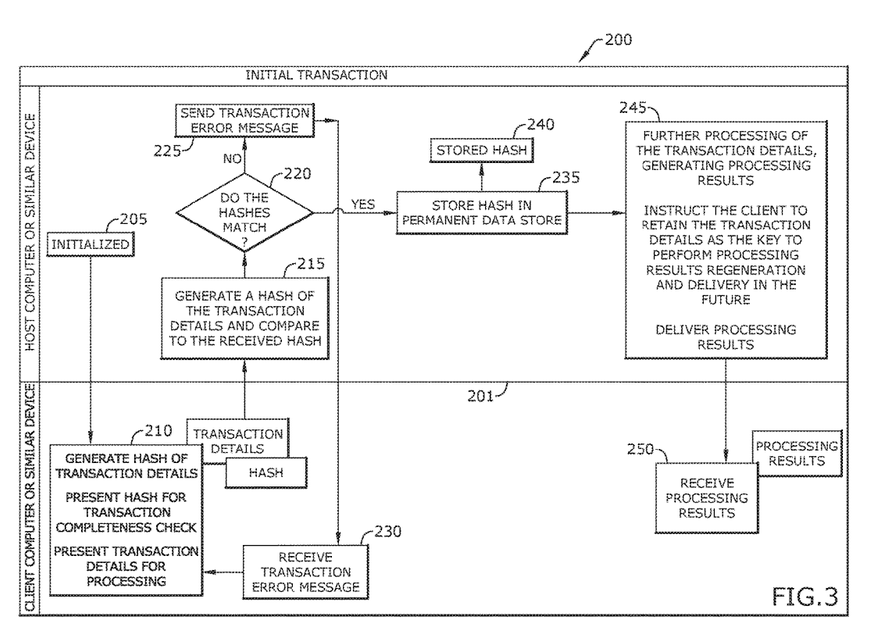
FIG. 3 is a flowchart of a method of performing network based transactions and protecting client information in an initial transaction according to an embodiment of the subject technology.

Referring now to FIG. 3, a method 200 of performing network based transactions and protecting client information in an initial transaction is shown. A line 201 conceptually represents the border between the client side and the host side. As will be appreciated, client details of a transaction remain stored on the client side of line 201 throughout the transaction process and are only temporarily seen on the host side during hashing and for processing the transaction result once authentication is confirmed. The method may initialize (205) when a host server receives a message to begin processing an online transaction from a client side server. The host side may transmit a message to the client side server to identify transaction information of the online transaction and process for presentation to the host side. The client side may generate (210) a first client side unique cryptographic hash function representing the identified transaction information details. During the generation of the first client side hash function, an audit for completeness of the information being represented by hashing may be performed. The generated client side hash function and the transaction details may be presented to the host side server. The host side server may read the transaction details and generate (215) a first cryptographic host side hash function of the transaction details following the same rules for hash generation as the client side. The host side may compare it to the first client side generated hash function to ensure the system is generating congruent hashing of the transaction. As may be appreciated, the transaction details presented by the client side to the host side are transient and are not stored by the host side. Aspects of the present invention provide security of the information by using hashing without storing the client's transaction details. The host side may compare the generated first client side hash function to the generated first host side hash function and determine (220) whether the generated first client side hash function matches the generated first host side hash function. Should the hashes not match, an error message may be sent (225) to the client side, which when received (230) may in turn perform the client side hash generation step again until there is congruency between the client side and the host side. In response to the first client side hash function matching the first host side hash function, the first host side hash function may be stored (235) in the host side server as a file 240 without storing the identified transaction information in the file 240. The transaction details and the online transaction may be processed (245) by the host side server. In some embodiments, the client may be instructed to retain the transaction's details for reference during requests to re-process the transaction in the future. The transaction results may be delivered to the client who receives (250) the results.

Figure 4:
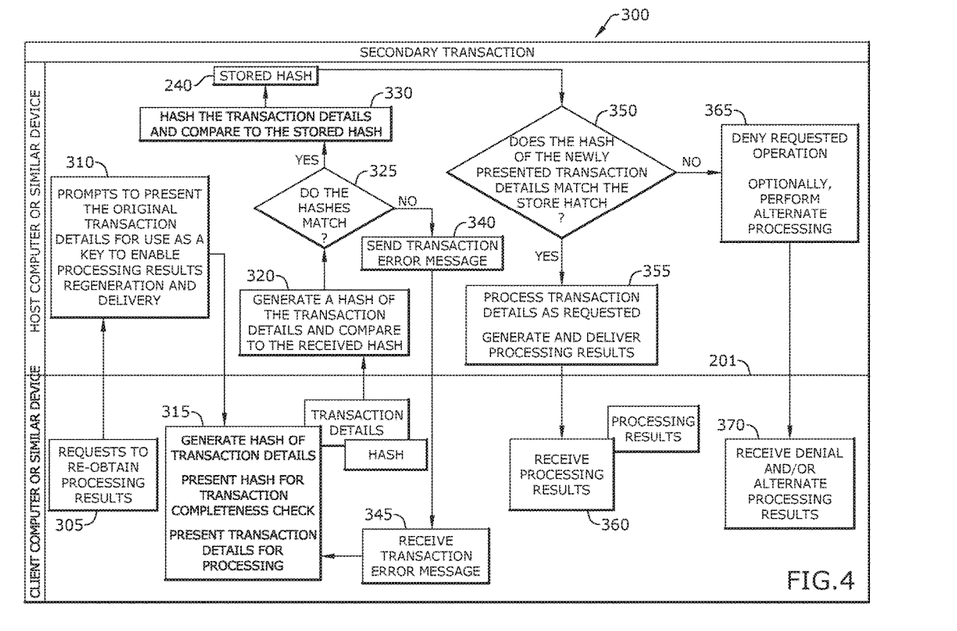
FIG. 4 is a flowchart of a method of performing network based transactions and protecting client information in a secondary transaction according to an embodiment of the subject technology.

Referring now to FIG. 4, a method 300 of performing network based transactions and protecting client information in a secondary transaction is shown. The method 200 and the method 300 may be embodied together or separately but as may be appreciated, typically the results of the method 200 are used to perform re-processing of a transaction without having to access stored client details from the host server side because the client details do not exist on the host side of line 201 and are thus protected from unauthorized access by entities trying to steal database information from the host side. The client side may request (305) re-processing of the transaction. The host side may prompt (310) the client side to present the original transaction details in response to the request. The client side may generate (315) a hash function representing the details of the transaction. Generally, the client side hash function follows the same rules used for example in method 200, which may result in this instance of the hash function being the same as the first client side hash function generated in block 210. The host side server may read the transaction details and generate (320) a second cryptographic host side hash function of the transaction details following the same rules for hash generation as the client side. The host side may compare it to the second client side generated hash function to ensure the system is generating congruent hashing of the transaction. The host side may compare the generated second client side hash function to the generated second host side hash function and determine (325) whether the generated second client side hash function matches the generated second host side hash function. Should the hashes not match, an error message may be sent (340) to the client side, which when received (345) may in turn perform the client side hash generation step again until there is congruency between the client side and the host side. In response to the second client side hash function matching the second host side hash function, the host side may compare (330) and determine (350) whether the second host side hash function matches the stored first host side hash function file 240. A negative result may cause the host side to deny (365) the requested transaction, the message for which may be received (370) by the client side. A positive match may cause the host side to re-process (355) the transaction and deliver the results which may be received (360) by the client side.

Figure 5:
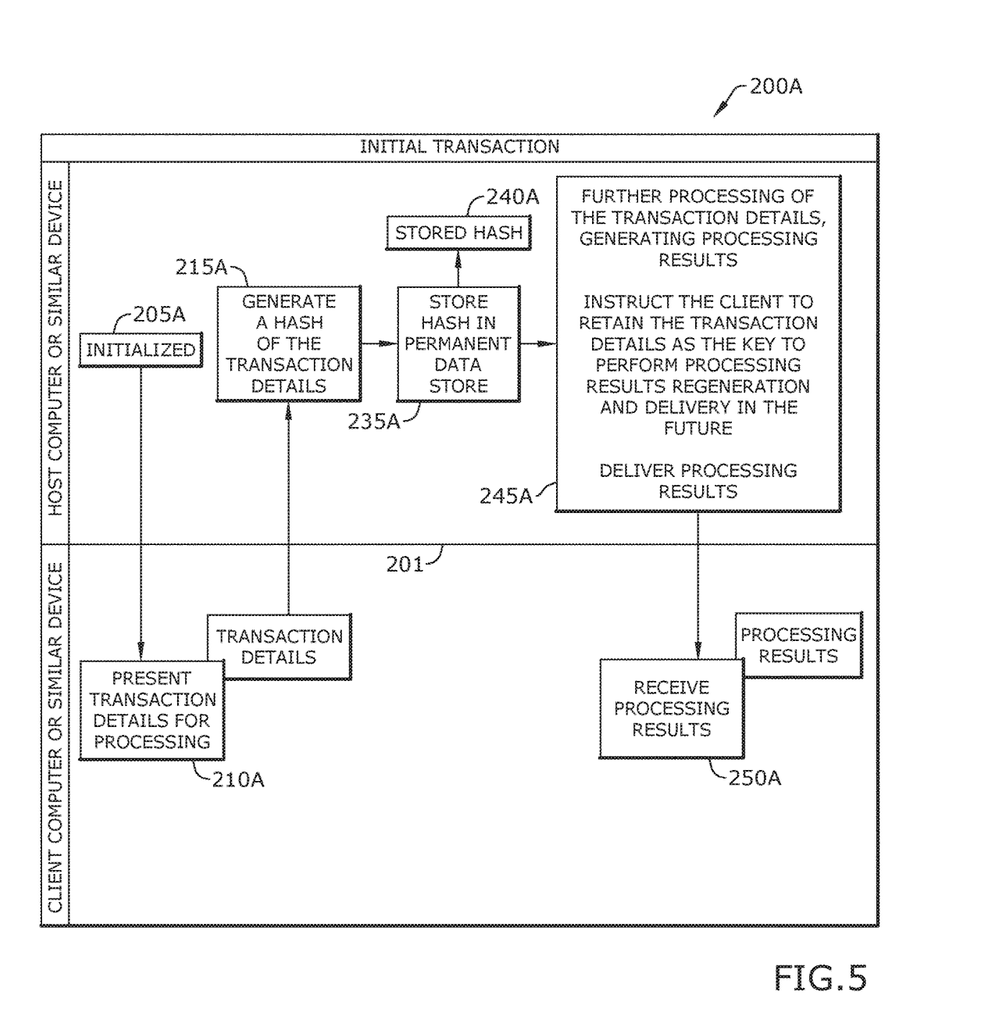
FIG. 5 is a flowchart of a method of performing network based transactions and protecting client information in an initial transaction according to another embodiment of the subject technology.
Figure 6:
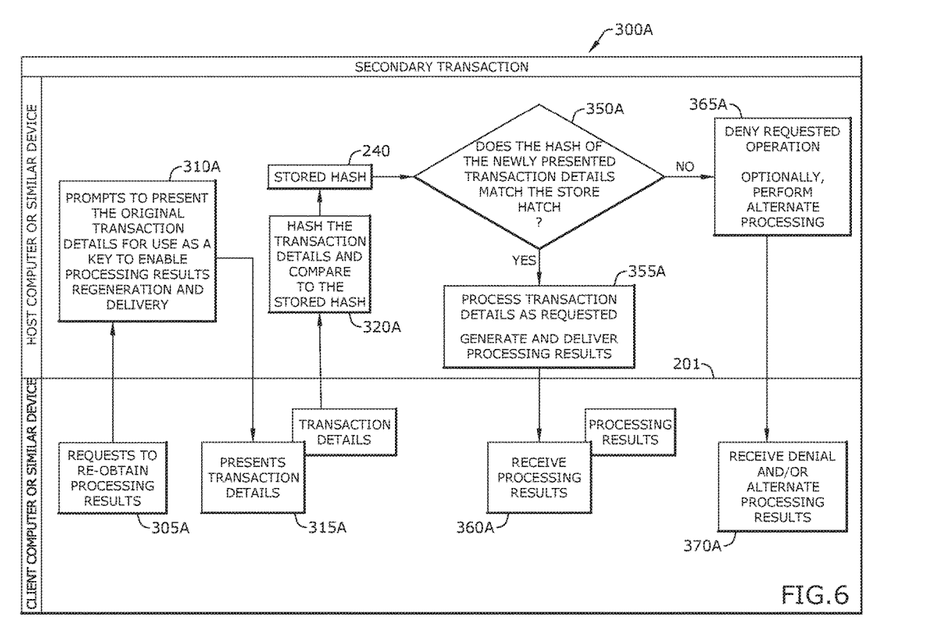
FIG. 6 is a flowchart of a method of performing network based transactions and protecting client information in a secondary transaction according to another embodiment of the subject technology.

Referring now to FIGS. 5 and 6, methods 200a and 300a of performing network based transactions and protecting client information in an initial transaction and a secondary transaction are shown. The method 200a is similar to the method 200 of FIG. 3 but for sake of illustration, the steps related to a negative hash comparison result are omitted. The method 300a is similar to the method 300 of FIG. 4 except that at block 315a, the client side does not necessarily generate a second client side hash function and may merely present the transaction details associated with the re-processing request to the host side. The host side may generate (320a) a second host side hash function based on the presented transaction details. The second host side hash function may be compared to the stored first host side hash function file 240. The host side may determine (350a) whether the second host side hash function matches the stored first host side hash function file 240. As can be seen, this embodiment uses hashing authentication on just the host side without the need to store the client's transaction details/information on the host side. Blocks 355a-370a follow similar actions to blocks 355-370 of FIG. 4 to provide authentication results of block 350a.

Figure 7:
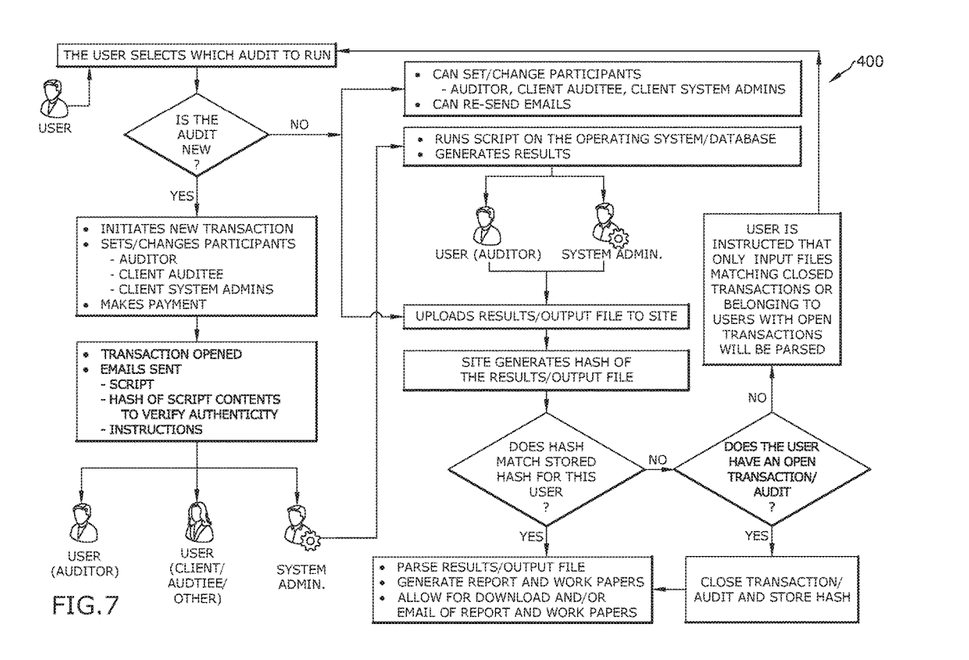
FIG. 7 is a flowchart of a method of auditing transactions and associated hash functions in a system according to an embodiment of the subject technology.

FIG. 7 shows an exemplary process 400 of auditing transactions according to embodiments described above. In general, users (including auditors, clients, system administrators can check if transactions meet the hash function checks described above. The blocks shown describe general features of steps that may be used in authenticating whether a transaction request matches the hash function associated with a user and the transaction.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for performing network based transactions and protecting client information, the computer program product comprising a non-transitory computer readable storage medium having computer readable program code embodied therewith, the computer readable program code being configured to:
    receive by a processor on a host side server of a network, a message to begin processing an online transaction;
    transmit by the processor on the host side of the network a message to a client side server to identify transaction information of the online transaction;
    generate, from a client side computer, a first client side hash function representing the identified transaction information;
    receive by the host side server, a transient copy of the identified transaction information;
    generate, in the host side server, a first host side hash function of the identified transaction information;
    compare the generated first client side hash function to the generated first host side hash function;
    determine whether the generated first client side hash function matches the generated first host side hash function;

in response to the generated first client side hash function matching the generated first host side hash function, store the generated first host side hash function in the host side server without storing the identified transaction information in the host side server;

receive, by the host side server a request to process the online transaction from the client side computer;

transmit, by the host side server, a request to present the identified transaction information;

generate, from the client side computer, a second client side hash function, the second client side hash function being the same as the first client side hash function;

provide to the host side server in a message from the client side computer, the second client side hash function without including the identified transaction details in the message from the client side computer;

determine, by the host side server, whether the second client side hash function matches the first host side hash function; and process by the host side server, the online transaction in response to the second client side hash function matching the first host side hash function.

2. The computer program product of claim 1, further comprising computer readable program code being configured to:

receive, by the host side server, a request from the client side server to re-process the online transaction;

receive, by the host side server from the client side server, a generated second client side hash function;

generate in the host side server, a second host side hash function representing transaction information in requested re-process of the online transaction;

compare by the host side server, the generated second client side hash function to the generated second host side hash function without storing the identified transaction information in the host side server;

determine whether the generated second client side hash function matches the generated second host side hash function; and in response to the generated second client side hash function matching the generated second host side hash function, re-process the online transaction.

3. The computer program product of claim 2, further comprising computer readable program code being configured to:

compare by the host side server, the generated second host side hash function to the stored first host side hash function without storing the transaction information in the request from the client side server to re-process the online transaction in the host side server;

determine whether the generated second host side hash function matches the stored first host side hash function; and in response to the generated second host side hash function matching the stored first host side hash function, re-process the online transaction.

4. The computer program product of claim 1, further comprising computer readable program code being configured to:

receive, by the host side server, a request from the client side server to re-process the online transaction;

receive, by the host side server from the client side server, identified transaction information associated with the request from the client side server to re-process the online transaction;

generate in the host side server, a second host side hash function representing transaction information in the request from the client side server to re-process the online transaction;

compare by the host side server, the generated second host side hash function to the stored first host side hash function without storing the transaction information in the request from the client side server to re-process the online transaction in the host side server;

determine whether the generated second host side hash function matches the stored first host side hash function; and in response to the generated second host side hash function matching the stored first host side hash function, re-process the online transaction.

5. A method of performing network based transactions and protecting client information, comprising:

receiving by a processor on a host side server of a network, a message to begin processing an online transaction;

transmitting by the processor on the host side of the network a message to a client side server to identify transaction information of the online transaction and generate a first client side hash function representing the identified transaction information;

generating, in the host side server, a first host side hash function of the identified transaction information;

comparing the generated first client side hash function to the generated first host side hash function;

determining whether the generated first client side hash function matches the generated first host side hash function;

in response to the generated first client side hash function matching the generated first host side hash function, storing the generated first host side hash function in the host side server without storing the identified transaction information in the host side server;

processing by the host side server, the online transaction;

receiving, by the host side server, a request from the client side server to re-process the online transaction;

receiving, by the host side server from the client side server, a generated second client side hash function;

generating in the host side server, a second host side hash function representing transaction information in the requested re-process of the online transaction;

comparing by the host side server, the generated second client side hash function to the generated second host side hash function without storing the identified transaction information in the host side server;

determining whether the generated second client side hash function matches the generated second host side hash function;

comparing by the host side server, the generated second host side hash function to the stored first host side hash function without storing the transaction information in the request from the client side server to re-process the online transaction in the host side server;

determining whether the generated second host side hash function matches the stored first host side hash function; and in response to:
the generated second client side hash function matching the generated second host side hash function, and
the generated second host side hash function matching the stored first host side hash function,
re-processing the online transaction.

6. A computer program product for performing network based transactions and protecting client information, the computer program product comprising a non-transitory computer readable storage medium having computer readable program code embodied therewith, the computer readable program code being configured to:

receive by a processor on a host side server of a network, a message to begin processing an online transaction;

transmit by the processor on the host side of the network a message to a client side server to identify transaction information of the online transaction and generate a first client side hash function representing the identified transaction information;

generate, in the host side server, a first host side hash function of the identified transaction information;

compare the generated first client side hash function to the generated first host side hash function;

determine whether the generated first client side hash function matches the generated first host side hash function;

in response to the generated first client side hash function matching the generated first host side hash function, store the generated first host side hash function in the host side server without storing the identified transaction information in the host side server;

process by the host side server, the online transaction;

receive, by the host side server, a request from the client side server to re-process the online transaction;

receive, by the host side server from the client side server, a generated second client side hash function;

generate in the host side server, a second host side hash function representing transaction information in the requested re-process of the online transaction;

compare by the host side server, the generated second client side hash function to the generated second host side hash function without storing the identified transaction information in the host side server;

determine whether the generated second client side hash function matches the generated second host side hash function;

compare by the host side server, the generated second host side hash function to the stored first host side hash function without storing the transaction information in the request from the client side server to re-process the online transaction in the host side server;

determine whether the generated second host side hash function matches the stored first host side hash function; and     in response to:

the generated second client side hash function matching the generated second host side hash function, and     the generated second host side hash function matching the stored first host side hash function,     re-process the online transaction.

\* \* \* \* \*